United States Patent Office 3,041,347
Patented June 26, 1962

3,041,347
PREPARATION OF SULFONATED PHTHALOCYANINES
Edward F. Klenke, Jr., Summit, N.J., assignor to E. I. du Pont de Nemours and Company, Wilmington, Del., a corporation of Delaware
No Drawing. Filed Dec. 6, 1960, Ser. No. 73,995
8 Claims. (Cl. 260—314.5)

This invention relates to a new and improved process for preparation of sulfonated copper phthalocyanine compounds.

Sulfonated copper phthalocyananines are well known. The principal uses of these compounds are as water-soluble dyes and as additives to unsulfonated copper phthalocyanine pigments to impart flocculation resistance to such pigments when they are used in coating compositions.

Two methods are know in the art for preparation of sulfonated copper phthalocyanine. One method involves the use of a sulfonated precursor in the synthesis of copper phthalocyanine. For example, 4-sulfophthalic acid may be substituted for a portion of the phthalic anhydride in the well-known phthalic anhydride-urea-copper chloride synthesis of copper phthalocyanine. The degree of sulfonation of the product obtained varies with the proportion of 4-sulfophthalic acid used, the sulfonic acid content increasing with increasing use of 4-sulfophthalic acid.

The second method known in the art for preparing sulfonated copper phthalocyanine involves the direct sulfonation of copper phthalocyanine by heating it at elevated temperatures with oleum or chlorosulfonic acid as described in Lubs, "The Chemistry of Synthetic Dyes and Pigments," Reinhold Publishing Corporation, New York (1955), p. 609.

It has now been found that a sulfonated copper phthalocyanine can be prepared by heating to reaction temperature phthalonitrile, a cupric salt such as cupric sulfate or cupric chloride, and an alkali hydrogen sulfate, such as potassium hydrogen sulfate or sodium hydrogen sulfate. A product fully equal to commercial sulfonated copper phthalocyanine is readily obtained by this improved process. This finding is particularly surprising when it is considered that neither phthalonitrile nor copper phthalocynanine is appreciably sulfonated by heating with an alkali hydrogen sulfate.

In a preferred embodiment of this invention, an intimate mixture of 4 mols of phthalonitrile, approximately 1 mol of anhydrous copper sulfate, and 8 mols of sodium hydrogen sulfate is heated at temperatures in the range of 190° C.–260° C. The product obtained contains approximately 2–3 sulfonic acid groups per phthalocyanine molecule, dissolves readily in water, and has properties corresponding to those of the sulfonated copper phthalocyanine sold commercially as a dye.

For a clearer understanding of the invention, the following specific examples are given. These examples are intended to be merely illustrative of the invention and not in limitation thereof. Unless otherwise specified, all parts are by weight.

*Example I*

100 parts of phthalonitrile, 33 parts of anhydrous cupric sulfate, and 200 parts of anhydrous sodium hydrogen sulfate are intimately mixed by tumbling them together in a conical blender. The resulting mixture is placed in a glass beaker of such size that the powdered mixture occupies approximately one-half the total volume of the beaker. The beaker, with the charge, is then placed in an oven at 200° C. and allowed to remain there for approximately one hour. At the end of the heating cycle, the beaker is removed from the oven, allowed to cool to room temperature, the reaction mass is removed from the beaker and then pulverized. On X-ray examination of the reaction product, there is obtained a diffraction pattern characteristic of sulfonated copper phthalocyanine known in the art. A blue solution with the absorption spectrum of sulfonated copper phthalocyanine is obtained when the reaction product is dissolved in water. Sulfonated copper phthalocyanine is separated from the solution by adding sodium chloride to a concentration of approximately 10%, filtering, and washing with 10% sodium chloride solution. Analysis of an aliquot of the reaction mass after purification by washing with a mixture of ethanol and water gives a sulfur content of 9.5%, corresponding to approximately 2.25 —$SO_3H$ groups per phthalocyanine molecule. Yield of the sulfonated product corresponds to approximately 60% of the theoretical.

*Example II*

An intimate mixture of 200 parts of phthalonitrile, 66 parts of anhydrous cupric sulfate, and 400 parts of anhydrous sodium hydrogen sulfate is prepared by crushing the mixture in a mortar and then passing it through a 60-mesh sieve, following which it is mixed by tumbling. The mixture is then charged to a screw-tube reactor of the type described in my copending application. Ser. No. 653,477 (now U.S. Patent 2,964,532) and heated rapidly to a temperature of 200° C. at which point the exothermic character of the reaction is sufficient to carry the reaction to conclusion in about 1 minute. The product is then recovered from the reactor and allowed to cool to room temperature. An aqueous solution of the product gives a blue color and an absorption spectrum characteristic of sulfonated copper phthalocyanine. The formation of sulfonated copper phthalocyanine is further confirmed by X-ray examination of the product.

*Example III*

The process of Example II is modified by replacement of the 66 parts of anhydrous cupric sulfate of Example II with 56 parts of cupric chloride, with substantially the same results as in Example II.

*Example IV*

The process of Example II is modified by the replacement of the sodium hydrogen sulfate with an equimolecular quantity of potassium hydrogen sulfate. On the basis of physical and chemical examination, the product obtained is substantially the same as that of Example II.

Either sodium hydrogen sulfate or potassium hydrogen sulfate can be used as the sulfonating agent in the process. Cupric chloride or hydrated cupric sulfate can be used in place of the preferred anhydrous cupric sulfate.

A ratio of about 2 moles of the alkali hydrogen sulfate to 1 mol of phthalonitrile and .25 mol of copper salt is preferred, but other proportions can also be used. A ratio as low as 0.25 mol of alkali hydrogen sulfate to 1 mol of phthalonitrile will show a perceptible degree of sulfonation. Moreover, a ratio in which the amount of alkali hydrogen sulfate is greater than 2 to 1 can be used, but increases above the 2 to 1 ratio do not significantly increase the sulfonating action. Large excesses of alkali hydrogen sulfate are objectionable on economic grounds. Good results can be obtained with about 0.25 to 0.28 mol of copper salt per mol of phthalonitrile. Proportions for the phthalonitrile and copper salt are substantially the same as those used in the well-known phthalonitrile synthesis for the production of unsubstituted copper phthalocyanine.

The reaction temperatures for the process of this invention are in the range of about 190° C.–260° C., and the optimum range is 225° C.–260° C.

Intimate contact between the reactants is essential for optimum results. In carrying out the reaction by use of the screw-tube reactor, it is desirable that the temperature in the initial portion of the tube be maintained somewhat below the optimum reaction temperature and that the material be heated rather rapidly to a temperature in the range of 200° C., at which point the exothermic character of the reaction will carry it on up to temperatures in the range of 240° C. Since the reaction itself results in heat, it does not usually become necessary to add heat to beyond about the first third of the length of the reactor tube. If desired, inert solid diluents, such as clay, sand, salt, titanium dioxide, and the like may be included in the reactant mixture when the reaction is carried out in a screw-tube reactor. Such diluents improve working properties of the mixture and aid in controlling reactant flow and heat transfer.

In carrying out the reaction of this invention, care should be exercised to avoid contacting the reactants with metal containers since most of the commonly used metals such as iron, nickel, etc. will enter into the reaction. If the metal is one other than copper, the desired product is contaminated by a foreign metal phthalocyanine. Also, reaction of the metal container will cause the container to be slowly corroded away. The use of a non-metallic container or a glass-lined metal container avoids these problems.

The present invention provides a low-cost process for manufacture of sulfonated copper phthalocyanine compounds. Compared to the prior art process which involved the use of relatively expensive sulfophthalic acid, the instant invention uses low-cost sodium hydrogen sulfate or potassium hydrogen sulfate as the source of the sulfonic substituents. Another advantage is that this invention makes available a novel and practical process for the manufacture of sulfonated copper phthalocyanines in relatively simple equipment requiring a modest investment. Also, the present invention avoids the separate steps of preparing the metal phthalocyanine and then sulfonating in a subsequent operation. Instead, it combines both synthesis and introduction of sulfonic acid groups into one low-cost process which eliminates the use of relatively large amounts of non-aqueous liquids as diluents, eliminates the step of removing a recovering these liquids, and avoids the corrosion and safety hazards connected with the use of concentrated sulfuric acid or chlorosulfonic acid. Moreover, the process of this invention is readily adaptable to a continuous operation.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the production of sulfonated copper phthalocyanine comprising heating until an exothermic reaction takes place an intimate mixture of phthalonitrile, a copper salt, and an alkali hydrogen sulfate.

2. A process for the production of sulfonated copper phthalocyanine comprising heating until an exothermic reaction takes place an intimate mixture of phthalonitrile, a copper salt selected from the group consisting of cupric chloride and cupric sulfate, and an alkali hydrogen sulfate selected from the group consisting of sodium hydrogen sulfate and potassium hydrogen sulfate.

3. A process for the production of sulfonated copper phthalocyanine comprising heating until an exothermic reaction takes place an intimate mixture of phthalonitrile, cupric sulfate, and sodium hydrogen sulfate.

4. A process for the production of sulfonated copper phthalocyanine comprising reacting at temperatures of about 190° C.–260° C. an intimate mixture of phthalonitrile, a copper salt, and an alkali hydrogen sulfate.

5. The process of claim 4 wherein the copper salt is cupric sulfate, the alkali hydrogen sulfate is sodium hydrogensulfate, and the reaction temperature is 225° C.–260° C.

6. The process of claim 4 wherein the copper salt is copper chloride, the alkali hydrogen sulfate is sodium hydrogen sulfate, and the reaction temperature is 225° C.–260° C.

7. The process of claim 4 wherein the copper salt is cupric sulfate, the alkali hydrogen sulfate is potassium hydrogen sulfate, and the reaction temperature is 225° C.–260° C.

8. The process of claim 4 wherein the copper salt is copper chloride, the alkali hydrogen sulfate is potassium hydrogen sulfate, and the reaction temperature is 225° C.–260° C.

No references cited.